United States Patent [19]
Hecker

[11] Patent Number: 6,101,525
[45] Date of Patent: *Aug. 8, 2000

[54] METHOD AND APPARATUS FOR SHARED MEMORY CLEANUP

[75] Inventor: Mark Bennett Hecker, Northboro, Mass.

[73] Assignee: EMC Corporation, Hopkinton, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/445,235

[22] Filed: May 19, 1995

[51] Int. Cl.[7] .................................................. G06F 12/00
[52] U.S. Cl. ............................................................ 709/104
[58] Field of Search .................................. 395/650, 700, 395/672, 678, 726; 709/104; 707/206

[56] References Cited

U.S. PATENT DOCUMENTS

| | | | |
|---|---|---|---|
| 4,847,754 | 7/1989 | Obermarck et al. | 364/200 |
| 4,912,629 | 3/1990 | Shuler, Jr. | 364/200 |
| 4,914,586 | 4/1990 | Swinehart et al. . | |
| 5,161,227 | 11/1992 | Dias et al. | 395/650 |
| 5,249,231 | 9/1993 | Covey et al. | 380/25 |
| 5,317,752 | 5/1994 | Jewett et al. | 395/750 |
| 5,333,319 | 7/1994 | Silen | 395/650 |
| 5,361,372 | 11/1994 | Rege et al. | 395/800 |
| 5,367,573 | 11/1994 | Quimby | 380/25 |
| 5,386,536 | 1/1995 | Serlet et al. . | |
| 5,398,334 | 3/1995 | Topka et al. . | |
| 5,437,031 | 7/1995 | Kitami | 395/650 |
| 5,440,743 | 8/1995 | Yokota et al. | 395/650 |
| 5,446,862 | 8/1995 | Ohkami | 395/427 |
| 5,446,901 | 8/1995 | Owicki et al. | 395/700 |

*Primary Examiner*—Lucien U. Toplu
*Assistant Examiner*—Alice Park
*Attorney, Agent, or Firm*—Maureen Stretch

[57] ABSTRACT

A shared memory clean application system assigns a process name to each process operating within a shared memory region and stores that name in shared memory elements used by that process. If there are more processes sharing an element than that element has space to keep the names, an overflow element is created and linked to the shared element. When a new element is requested and no free elements are available, the invention selects an element, clears its use count, and then reviews all the names in that shared element array to see if they match existing valid processes. If an existing process is found that matches a name in the array, the use count is incremented for that process. If no existing process match is found for a process name in the element array, that name is deleted from the array. If overflow elements exist, they are also cleared of names that do not match, or deallocated entirely if the review indicates there is an overflow element that no longer has process names associated with it.

14 Claims, 6 Drawing Sheets

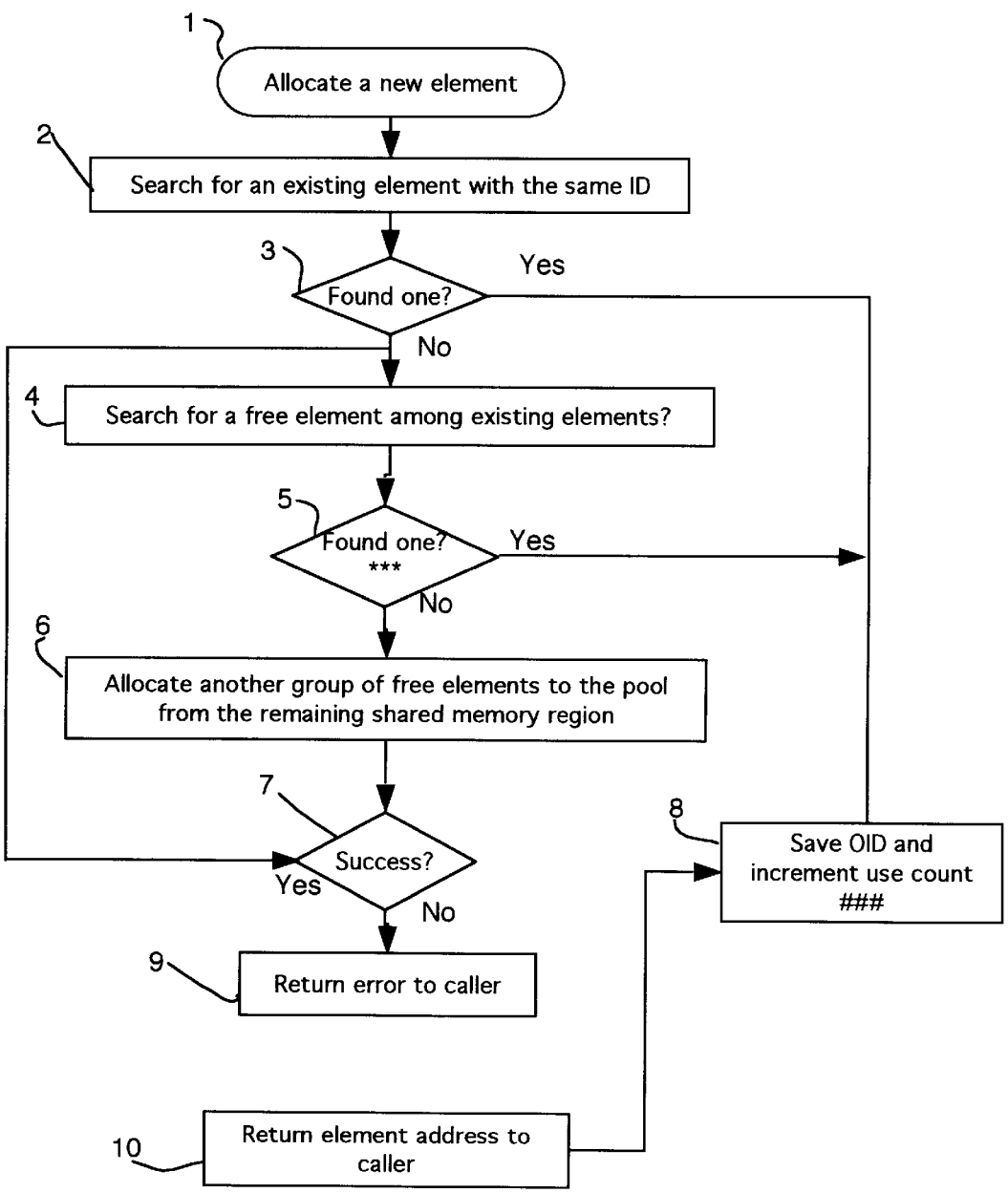

METHOD AND APPARATUS FOR SHARED MEMORY CLEANUP

BACKGROUND OF THE INVENTION

This invention relates generally to computer systems having multiple processes and in particular to memory management cleanup systems for memory shared amongst one or more processes.

Shared memory is useful for interprocess communications and is provided in several computer operating systems. Those operating systems that allow shared memory also provide some form of memory management as well. In the more primitive systems, if a process terminates normally it is disconnected from shared memory, but if it terminates abnormally, an unsophisticated system might not free up the memory it used. Thus other applications might not see that the terminated process was no longer using the space but would think that portion of memory was still in use. Over time memory resources could be severely impacted.

As a result, more recent operating systems incorporate some type of cleanup or "garbage collection" to free up shared memory resources that were allocated to now-defunct processes or programs, including shared resources allocated to processes that terminated abnormally. Since the operating system controls the creation and termination of processes, it is usually designed to not only withstand but to know about any abnormal terminations of processes when they occur. Given this knowledge, the operating system is easily able to free up shared memory resources when such an abnormal termination is detected.

However, in some operating systems, there are limitations placed on shared memory use. For example, in the Unix operating system a single process can only share memory with about 12 or fewer regions. There are also limits on the number of shared memory objects that can be created at any one time across the system.

To circumvent such operating system limits, in an otherwise desirable operating system, some users create application systems that have one shared memory partition or region used for one or more memory pools, each of which may contain many shared memory elements, and layers of application software manage the elements within the shared space.

In this approach a shared memory pool is created by the application program. It contains memory elements. Each element has an object identifier (id) and a use count. When an application system client program wishes to share access to information about an object, it allocates an element in the shared memory pool using that object's identifier as a key. If it is the first program sharing information about that object, a use count of zero is found so the program will increment the use count to 1 and store the object id in the element. If more application system programs want to share information about the same object, they find the existing element with the relevant object id and increment the use count.

To minimize overhead and duplication of operating system memory management, some application systems further provide that when a process is no longer interested in the shared object information it decrements the use count for the corresponding shared memory element. When all processes have disconnected from a particular object's information, the use count should be decremented back to 0, thus freeing up the shared memory element for reuse. However, if a process doesn't explicitly disconnect from the element before it terminates, as is often the case for abnormal terminations, the use count will not be decremented for that client program or process and will never return to 0. The storage will not be reused. Since the shared memory partition is a fixed size, the repeated loss of these elements may ultimately jeopardize the ability to allocate new elements, and there will be many unused elements that appear to be used. FIG. 4 shows an existing implementation of this approach.

Processes that terminate abnormally are usually not able to disconnect from their shared memory elements before termination. Hence, they are likely to leave behind elements that appear to be in use, but are not. Since an application system, unlike an operating system, is not usually aware of abnormal terminations such as these, it is more difficult for it to provide the garbage collection function that the operating system does.

Application systems having multiple processes sharing memory elements are thus susceptible to out-of-memory situations if they take a considerable time to execute. As an example, backup application systems for large disk storage systems having multiple disks in array configurations may have several backups operating concurrently, each backup operating as a process. Such backups may take hours to execute.

Such backup application systems are often run unattended overnight from client workstations or servers over a network, and are responsible for backing up anywhere from a few megabytes to gigabytes or multiples of gigabytes from disks to tape on anywhere from one to 96 or more disks in a system. If the backup application system is in the middle of backing up several hours worth of work and multiple gigabytes of data, out of memory situations can be a severe problem.

If several processes terminate abnormally, the backup application system may attempt to continue but eventually may be unable to allocate shared memory to new or replacement processes, or even existing processes that need more.

This, in turn, can cause the failure of the entire backup. Since backups of large systems are often done unattended overnight, they may need to be rerun during the day, if possible, or rescheduled for the following night. If a scheduled backup does not occur, the user's data is more at risk if catastrophic disk failures occur.

It is an object of the present invention to provide a shared memory cleanup for an applications system.

It is another object of the present invention to free up unused shared memory elements, returning them to the pool of available elements.

Still another object of the present invention is to provide a way for an application memory management program to free shared memory elements allocated to programs or processes that have terminated abnormally.

SUMMARY OF THE INVENTION

These and other objects of the invention are achieved by a shared memory cleanup application system that assigns a process name to each process operating within a shared memory region and stores that name in shared memory elements used by that process. If there are more processes sharing an element than that element has space to keep the names, an overflow element is created and linked to the shared element. When a new element is requested and no free elements are available, the invention selects an element, clears its use count, and then reviews all the names in that shared element array to see if they match existing valid processes. If an existing process is found that matches a name in the array, the use count is incremented for that process. If no existing process match is found for a process name in the element array, that name is deleted from the array. If overflow elements exist, they are also cleared of names that do not match, or deallocated entirely if the review indicates there is an overflow element that no longer has process names associated with it.

It is an aspect of the present invention that it permits application systems to reuse shared memory elements that have been left in the system by abnormally terminated processes.

It is another aspect of the present invention that it can be used to clean up other types of shared resources similar in nature to shared memory elements.

BRIEF DESCRIPTION OF THE DRAWINGS

FIG. 4 is a flow diagram of a conventional method of handling shared memory resources.

DETAILED DESCRIPTION OF THE INVENTION

Figure 1:
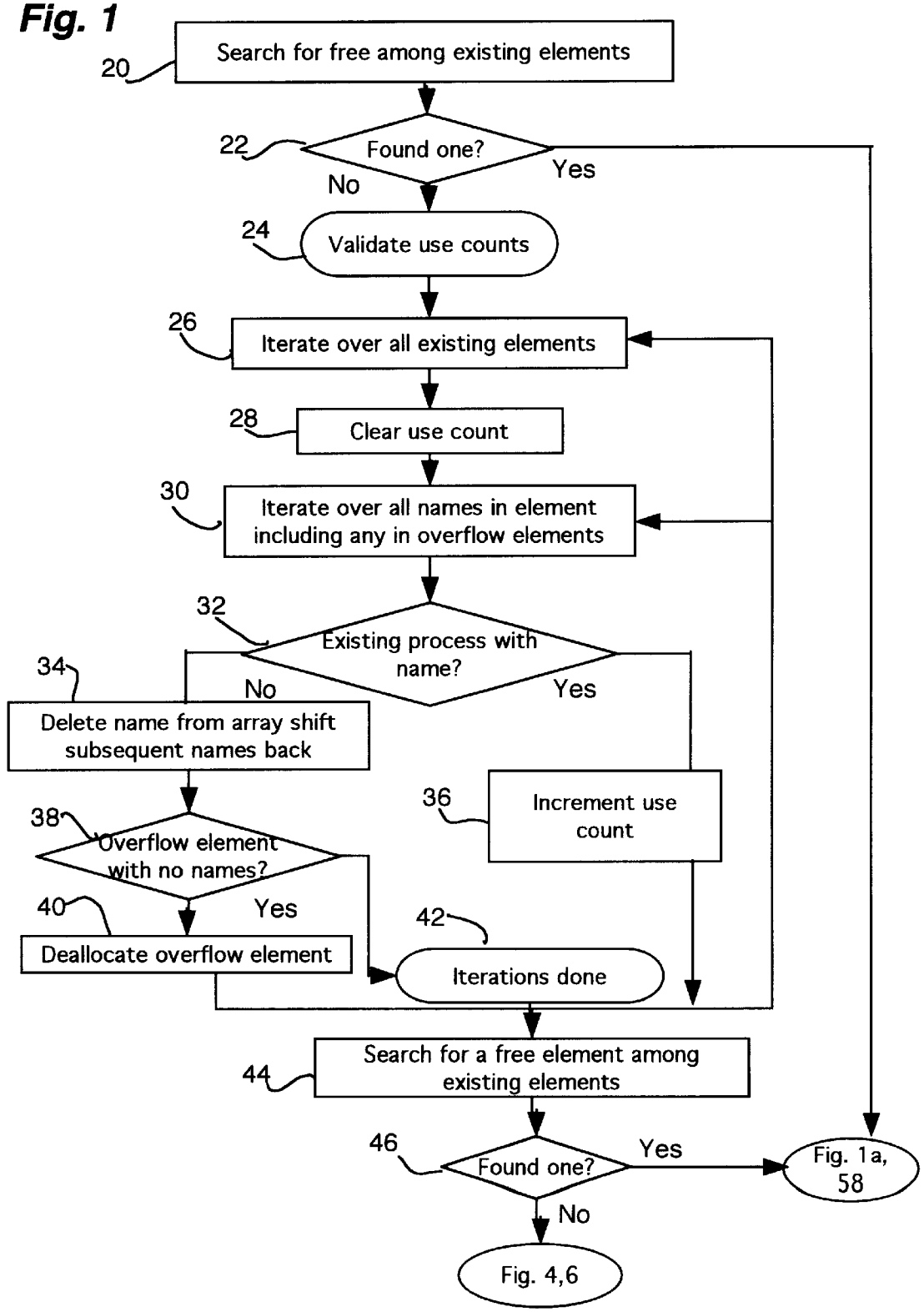
FIG. 1 is flow diagram of the present invention.

In FIG. 1, a flow diagram of a preferred embodiment of the present invention is shown. In this embodiment, the invention operates as a part of an overall, existing conventional applications memory management system such as the system illustrated in FIG. 4. Turning to FIG. 4, at step 1, the system is being asked to allocate a new shared memory element. At step 2, a search is made for an existing element with the same object identifier. If one already exists, the system saves the object id and increments the use count at step 8 and returns the element address to the caller at step 10. If an existing element is not found, the system proceeds to step 4 to search for a free element among existing elements. If one is found, the system proceeds to step 8. If one is not found, in the previous implementations, the system would go to Step 6, and attempt to allocate another group of free elements to the pool from the remaining shared memory region (shown in FIG. 3 and described below.) If there is no additional memory available in the shared memory region, the previous system would proceed to step 9, and return an error to the caller. However, according to the method and apparatus of the present invention, old steps 4 and 5 are replaced by the flow diagram in FIG. 1.

Now in FIG. 1, if a search for a free element among existing elements, at step 20 fails, as is detected at step 22, the present invention validates the use counts in the flow that follows step 24. First, the invention iterates or checks through all the existing elements at step 26. For each existing element, the use count is cleared at step 28, and then the invention, at step 30 iterates through all names in the element, including any names in overflow elements that have been assigned.

Figure 2:
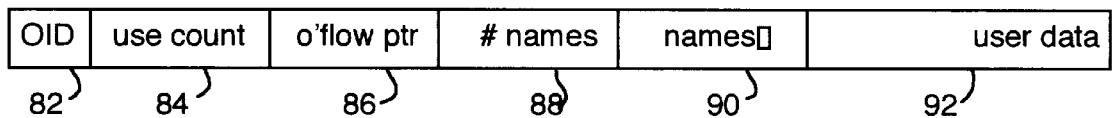
FIG. 2 is a block diagram of a shared memory element according to the method and apparatus of the present invention.
Figure 2A:
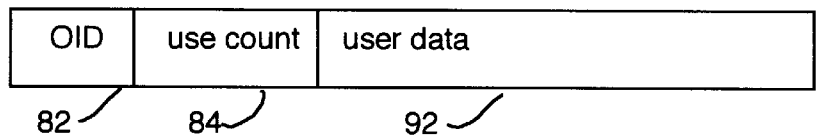
FIG. 2a is a block diagram of a conventional shared memory element.

Turning briefly to FIG. 2, a new shared memory element according to the method and apparatus of the present invention is shown. Prior implementations used shared memory elements similar to that in FIG. 2a, with an object identifier 82, a use count 84, and user data field 92. In a preferred embodiment of the present invention the new shared memory element 80, shown in FIG. 2 includes those fields but adds a number-of-names field 88 and a names field 90, together with an overflow pointer 86. A name is assigned by the invention to each process that requests a shared memory element 80.

In a preferred embodiment of the present invention, the process identifier assigned by the operating system is used by the invention as the process name. As will be apparent to those skilled in the art, however, other naming schemes could be used to uniquely identify each process requesting a shared resource, as long as that naming technique is supported by the operating system in such a way that it both guarantees uniqueness and can be used to verify the continued existence of processes, tasks, or programs. Sequential numbers could be assigned, or keys or codes could be generated in connection with an operating system identifier to identify each active process.

In a preferred embodiment, the present invention uses a Unix command to determine whether a named process exists. Specifically, the kill (pid, signal) function directs the specified signal to the specified process. If the specified signal is zero (not a valid signal), the function validates the process ID argument but sends no signal. If no process ID exists for that argument, an error is returned from the call. This indicates that the named process associated with that process ID no longer exists.

In another embodiment, a list of all valid processes could be retrieved from the operating system, and each process ID could be checked against the names in a valid process list. In this preferred embodiment, the use count does not need to be cleared, but can simply be replaced by the count of the number of matches between active processes and names in the shared element resource 80's. In yet another variation, in another embodiment, a count of valid names can be kept as each name in shared element 80 is reviewed to see if a match exists. This count of valid names is then used to replace the use count for that element, when all the names have been processed.

Returning now to FIG. 1, at step 30 a preferred embodiment of the present invention iterates or searches through all names in a shared memory element 80, by comparing each name in name field 90 with existing process identifiers active in the system, using the kill (pid, signal) function described above.

If a match is found with an existing, active process at step 32, the system increments use count 84 in shared memory element 80 and proceeds to step 42 to see if the iterating or looping is done.

Still at Step 32 of FIG. 1, if no existing active process is found which matches one of the names in shared memory element 80's name field 90, that name is deleted from shared memory element 80 at step 34, and the remaining names in name field 90 are shifted back accordingly, and the number of names 88 is decremented by one.

Next, at Step 38, in FIG. 1, the present invention checks to see if any overflow elements for shared memory element 80 would now be left with no names. If they are, this means that they can be freed up and the invention deallocates them at step 40.

Once the invention has completed the iteration through all the names in an element, and through all existing elements, at step 42, a check is done again, at step 44 for a free element. At this point, any shared memory elements that were associated with names of now defunct processes have been freed up. Since all use counts are cleared before the name checking is done, and only existing active processes have had their use counts incremented, the only non-zero use counts that will be found now are those associated with active, existing processes.

Figure 1A:
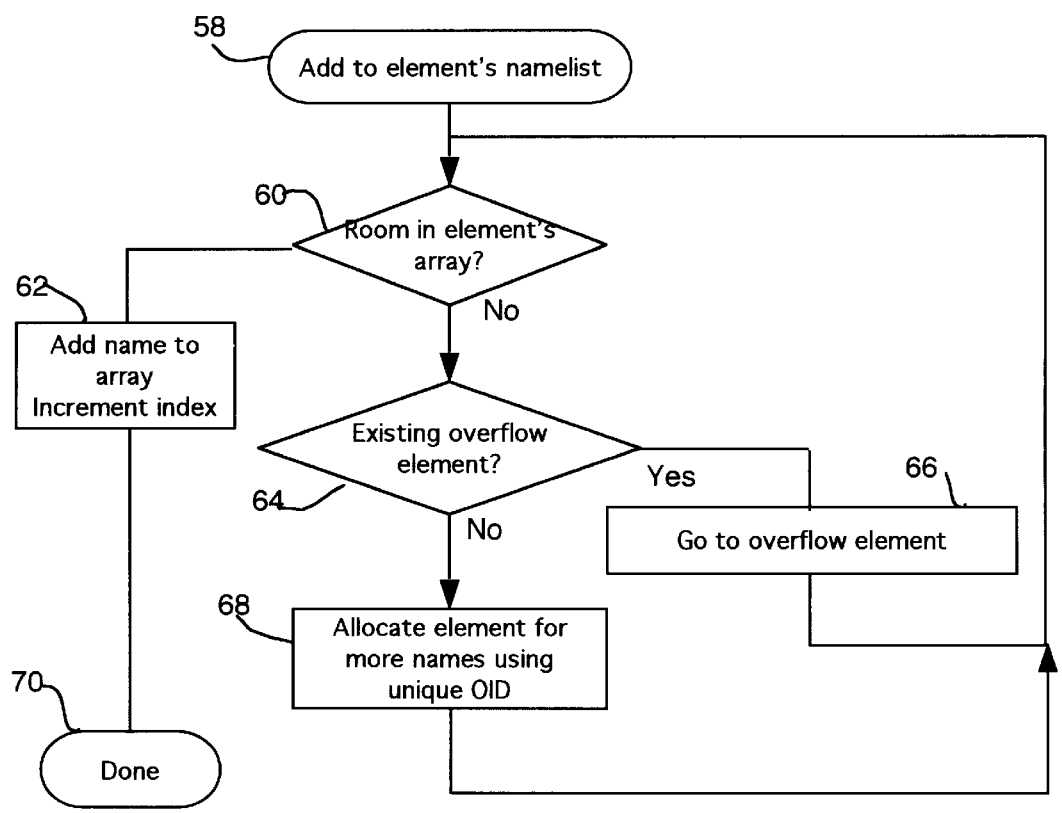
FIG. 1a is a flow diagram of an adjunct part of the present invention.

If a free element is found among existing elements at step 44, the invention proceeds to Step 58 in FIG. 1a, to add the requesting process' name to the element's namelist. If there is room in shared memory element 80's name field 90, its name is added at Step 62 and the number of names field 88 is incremented. If there is no room in name field 90, the system checks, at Step 64 to see if an overflow element exists, as shown by overflow pointer 86. If an overflow element exists, the system proceeds to it and updates the name field. If one does not exist, the invention, at step 68 allocates one, using a unique object identifier.

In a preferred embodiment, unique object identifiers are random numbers generated by any of a number of random number generator algorithms, coupled with a timestamp. In this approach, the probability of more than one object identifier having the same number at the same time is close enough to zero to provide a considerable degree of comfort that the object identifiers are unique. As will be apparent to those skilled in the art, a simple random number without a timestamp, or even a sequentially assigned number could be used, if the number of objects that need to be uniquely identified are sufficiently low that these approaches will not create a likelihood of assigning the same number to two different identifiers.

Still in FIG. 1, if no free element is found at step 44, all of the currently allocated elements are now known to be legitimately in use. In this case, more elements must be added to the pool. Adding new elements is also done in a prior implementation, as shown in FIG. 4, at step 6. However, new processing needs to be done to accomplish this according to the method and apparatus of the present invention. step. This is shown in FIG. 1a, at step 58.

As shown there, once a shared element 80 has been selected, the present invention checks to see if there is room in that element's array to include the requesting process's name. If it is determined, at step 60, that there is not room, and also that the same is true for any overflow elements, the present invention allocates a new shared element 80, from the shared memory pool, and creates a unique object identifier, as described above, for this element.

Since room for a new name has now been created, the name of the requesting process is then added at step 62, according to the method and apparatus of the present invention, to name field 90 and the number of names field, 88, is incremented.

Still in FIG. 1a, if the process that requested a shared element 80 terminates normally, it will call the application memory management to cause use count 84 of shared element 80 to be decremented. If the application's memory management then determines, at step 52, that use count 84 is zero, the unique object identifier 82 will be cleared, thus returning shared element 80 to the shared memory pool. This decrementing and deallocation, shown in FIG. 4a at steps 48 to 56, is what is inadvertently bypassed in the prior implementation if the process terminates abnormally.

Figure 3:
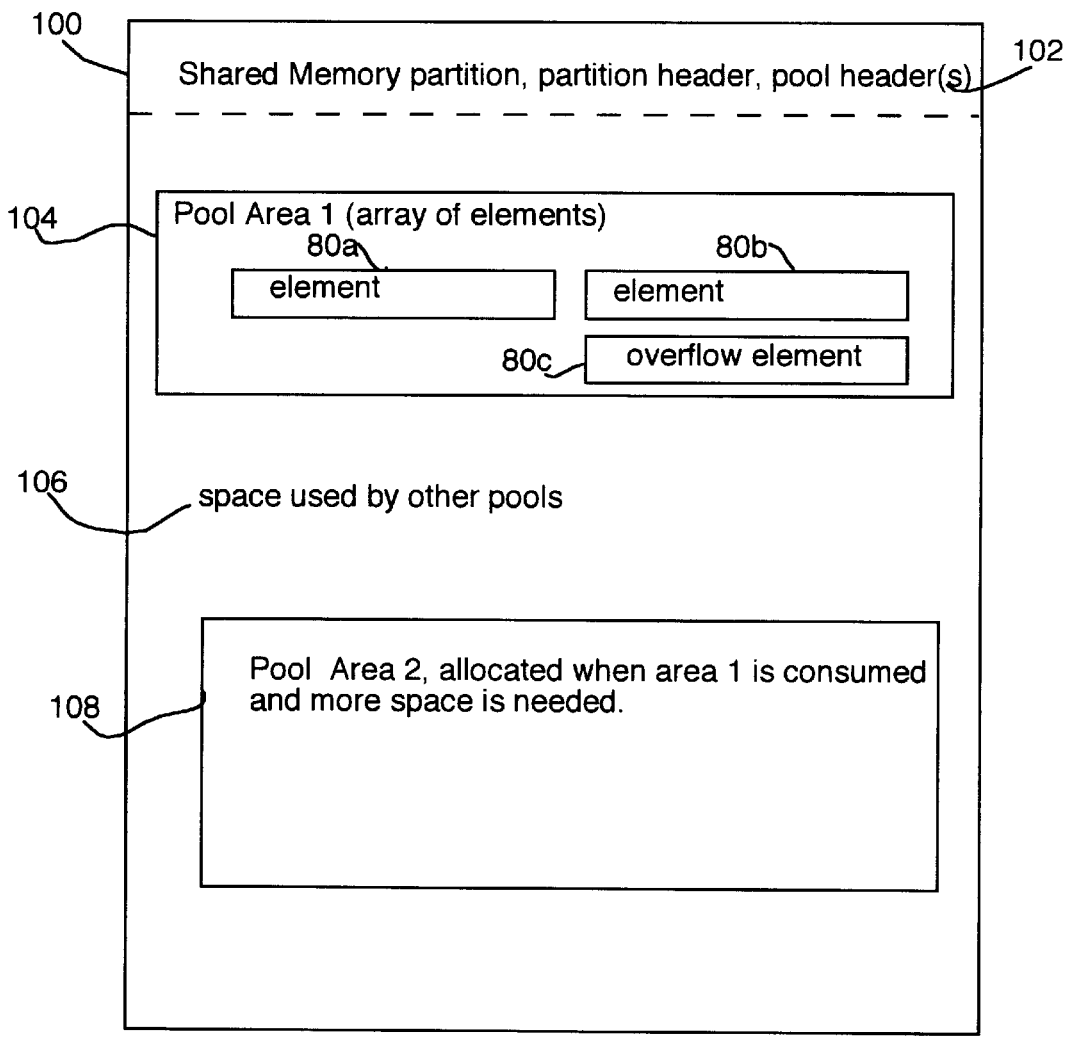
FIG. 3 is a block diagram of a shared memory partition.
Figure 4A:
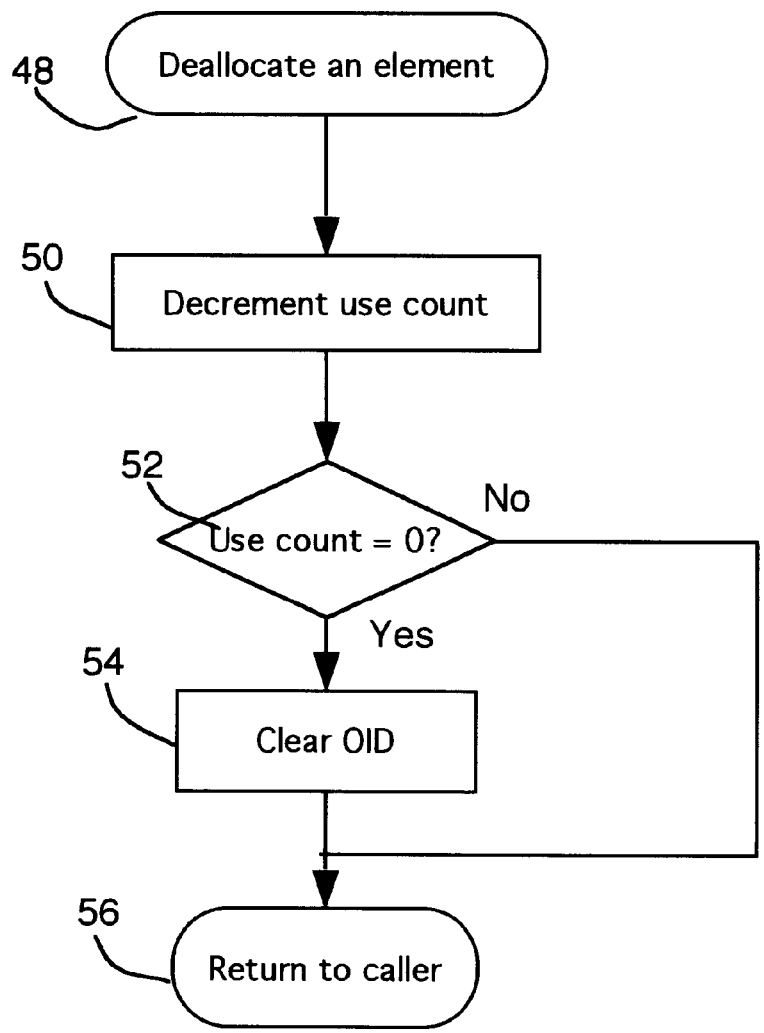
FIG. 4a is a flow diagram of an adjunct part of the present invention.

Turning now to FIG. 3, a shared memory partition 100 of a fixed size used in a preferred embodiment of the present invention is shown. Headers 102 contain addresses and other header information about the partition itself and pool areas within it. Pools 104 and 108 created according to the method and apparatus of the present invention are shown as depicting two pools containing shared memory elements such as shared memory elements 80a and 80b. Between pools 104 and 108 is space 106 used by other pools not associated with the present invention.

In one embodiment of the present invention, memory partition 100 and pools 104 and 108 are fixed in size. Still in FIG. 3, shared memory elements 80 are also fixed in size. In a preferred embodiment of the present invention, in such a fixed size situation, the user data field of overflow element 80c is used exclusively to contain names of additional processes sharing the shared memory element 80 to which overflow element 80c is linked. Overflow elements 80c are created by the present invention, as described above and they are not visible to the user or requesting process. No user program or process is aware of the unique object identifier 82, used for the overflow element, so there is no possibility that any user data will occupy any portion of user data 92 of an overflow element 80c. In systems where memory sizes of partitions, pools and elements are fixed, this represents a significant savings in memory use. Embodiments that use variable sized elements might not require this feature of the present invention to save space.

While a preferred embodiment of the present invention is used to manage shared memory elements 80 for disk backup applications, it will be apparent to those skilled in the art that the method and apparatus of the present invention could be used to manage other shared objects, and in other types of applications using multiple processes.

In a preferred embodiment, the present invention is embodied in computer application software written in the C++ programming language for Unix operating systems. As will be apparent to those skilled in the art, it could also be embodied in computer application software written in other programming languages, such as C, or assembler or ADA or Pascal, or Visual Basic and so on, for either Unix or other operating systems that permit multiple processes to share some limited resources, and as long as the language chosen either allows direct use of operating system primitives or permits calls or other functions to invoke them. Similarly, while a preferred embodiment operates as application software brought into a computer from a disk library for execution, it could also be embodied in firmware or circuitry or gate arrays for special purpose applications.

Those skilled in the art will appreciate that the embodiments described above are illustrative only, and that other systems in the spirit of the teachings herein fall within the scope of the invention.

What is claimed is:

1. A method for finding and removing unused shared resource elements which erroneously appear to be in use because the failure of the process using them has not been detected in an application system having multiple processes, comprising the steps of:

creating a shared resource element having a format that includes an object identifier field, a name field, a use count field and a user data field;

storing a name of a requesting process in said name field of said shared resource element and incrementing said use count field when a first said shared resource element is allocated;

validating names of requesting processes stored in said name field of said shared resource element with active processes when a second shared resource element is requested but unavailable; and replacing said use count in said use count field, with the number of names that have been validated in said validating step so that processes that have terminated abnormally are no longer reflected in said shared resource element, thereby permitting it to be reused or freed.

2. The method of claim 1, comprising the steps of:

selecting a shared resource element to be evaluated for use;

clearing said use count in said use count field of said shared resource element;

comparing names in said name field of said shared resource element to names of existing active processes incrementing said use count when a match is found between names in said name field of said element and names of existing active processes; and deleting a name from said name field of said shared resource element when no match is found with said names of existing active processes, so that said shared element will have a use count of zero and no names in its name field if it is no longer in use.

3. The method of claim 1, comprising the steps of:

selecting a shared resource element to be evaluated for use;

comparing names in said name field of said shared resource element to names of existing active processes replacing said use count when matches have been found between names in said name field of said element and names of existing active processes with the total number of matches; and deleting a name from said name field of said shared resource element when no match is found with said names of existing active processes, so that said shared element will have a use count of zero and no names in its name field if it is no longer in use.

4. The method of claim 1, further comprising the steps of:

adding an overflow pointer field to said shared resource element format;

allocating an overflow element for said shared resource element if said name field in said shared resource element is full when a new process asks to share said shared resource element, using the same steps to allocate said overflow element as is used to allocate said shared resource element;

linking said overflow element to said shared resource element by inserting an overflow pointer in an overflow pointer field of said shared resource element.

5. The method of claim 4 further comprising the step of storing names of requesting processes in said overflow element's user data field.

6. The method of claim 1 further comprising the step of using process identifiers created by the operating system in use, as the names for requesting processes.

7. The method of claim 1, further comprising the step of using a next random number created by a random number generator, coupled with a timestamp, as the object identifier when a new element such as a shared resource element or overflow element is allocated.

8. An apparatus for finding and removing unused shared resource elements which erroneously appear to be in use because the failure of the process using them has not been detected in an application system having multiple processes, comprising:

a shared resource element having a format that includes an object identifier field, a name field, a use count field and a user data field;

a store function for storing names of processes requesting said shared resource in said name field of said shared resource element; and a validation function for matching names of requesting processes stored in said name field of said shared resource element with active processes when a second shared resource element is requested but unavailable; and a replacement function to replace said use count in said use count field, with the number of names that have been validated so that processes that have terminated abnormally are no longer reflected in said shared resource element, thereby permitting it to be reused or freed.

9. The apparatus of claim 8, comprising:

a routine for selecting a shared resource element to be evaluated for use;

a clear function for clearing said use count in said use count field of said shared resource element;

a comparison function for comparing names in said name field of said shared resource element to names of existing active processes;

an increment function for incrementing said use count when a match is found between names in said name field of said element and names of existing active processes; and a delete function for deleting a name from said name field of said shared resource element when no match is found with said names of existing active processes, so that said shared element will have a use count of zero and no names in its name field if it is no longer in use.

10. The apparatus of claim 8, comprising:

a routine for selecting a shared resource element to be evaluated for use;

a comparison function for comparing names in said name field of said shared resource element to names of existing active processes;

a replacement function for replacing said use count when matches have been found between names in said name field of said element and names of existing active processes, with the total number of matches; and a delete function for deleting a name from said name field of said shared resource element when no match is found with said names of existing active processes, so that said shared element will have a use count of zero and no names in its name field if it is no longer in use.

11. The apparatus of claim 8, further comprising:

a shared resource element having a format that includes an overflow pointer field;

an allocation function for allocating an overflow element for said shared resource element if said name field in said shared resource element is full when a new process asks to share said shared resource element, using the same function to allocate said overflow element as is used to allocate said shared resource element;

an overflow pointer in said overflow pointer field, for linking said overflow element to said shared resource element.

12. The apparatus of claim 10 further comprising a function for storing names of requesting processes in said overflow element's user data field.

13. The apparatus of claim 8 further comprising the inclusion of process identifiers created by the operating system in use, as the names for requesting processes.

14. The apparatus of claim 8 further comprising a next random number created by a random number generator, coupled with a timestamp, as the object identifier to be used when a new element such as a shared resource element or overflow element is allocated.

* * * * *